(12) United States Patent
Nakamura et al.

(10) Patent No.: US 10,635,955 B1
(45) Date of Patent: Apr. 28, 2020

(54) IMAGE FORMING METHOD, APPARATUS, AND PROGRAM SEPARATING ADDRESSES FOR STORING COLOR TONE DATA BY SHIFTING THE RELATIVE ADDRESS USING AN OFFSET ADDRESS

(71) Applicant: Kyocera Document Solutions Inc., Osaka (JP)

(72) Inventors: Masayoshi Nakamura, Torrance, CA (US); Dongpei Su, Palos Verdes Estates, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/427,373

(22) Filed: May 31, 2019

(51) Int. Cl.
G06K 15/02 (2006.01)
H04N 1/50 (2006.01)
H04N 1/64 (2006.01)

(52) U.S. Cl.
CPC ..... G06K 15/1857 (2013.01); G06K 15/1836 (2013.01); G06K 15/1861 (2013.01); H04N 1/504 (2013.01); H04N 1/64 (2013.01)

(58) Field of Classification Search
None
See application file for complete search history.

(56) References Cited

U.S. PATENT DOCUMENTS

| | | | |
|---|---|---|---|
| 4,122,520 A | 10/1978 | Adamchick et al. | |
| 4,435,792 A | 3/1984 | Bechtolsheim | |
| 6,009,245 A | 12/1999 | Kato et al. | |
| 7,535,593 B2 * | 5/2009 | Ishizaka | G06F 3/122 347/76 |
| 8,767,252 B2 * | 7/2014 | Schlachter | H04N 1/3871 358/1.16 |

FOREIGN PATENT DOCUMENTS

JP 2011-049893 A 3/2011

* cited by examiner

*Primary Examiner* — Scott A Rogers
(74) *Attorney, Agent, or Firm* — James Judge

(57) ABSTRACT

An image forming method uses a memory, forms an image on a print medium using color materials of L colors, and includes: setting N groups associated for respective N objects including a plurality of scanning lines and reproduced with the color materials of the L colors; calculating a relative address that stores tone data representing a tone of one color material among the color materials of the L colors based on coordinates of a plurality of pixels forming the plurality of scanning lines to calculate L addresses separated by shifting the relative address using a predetermined offset address; and transmitting and receiving L tone data representing tones of respective L color materials for reproducing colors of the plurality of pixels forming the scanning lines by using the L addresses to/from the memory via L channels among M (M is an integer larger than N) communication channels.

18 Claims, 7 Drawing Sheets

Coordinate of Pixel R: (0,0)
Coordinate of Pixel A: (6,4)
Coordinate of Pixel B: (17,4)
Coordinate of Pixel C: (6,11)
Coordinate of Pixel D: (17,11)
WARP: Memory Amount for 12 Pixels Pixel Address = Base Address + Offset Address
    + Y-Coordinate × WARP + X-Coordinate ··· Formula F Here, Index (DEPTH) = 8 bits (1 byte)/pixel

US 10,635,955 B1

IMAGE FORMING METHOD, APPARATUS, AND PROGRAM SEPARATING ADDRESSES FOR STORING COLOR TONE DATA BY SHIFTING THE RELATIVE ADDRESS USING AN OFFSET ADDRESS

BACKGROUND

Unless otherwise indicated herein, the description in this section is not prior art to the claims in this application and is not admitted to be prior art by inclusion in this section.

An image forming apparatus (for example, a printer, a multifunction printer, or a multi-functional peripheral (Multifunction Peripheral)) can execute a print processing based on a print job described in Page Description Language. The print processing includes a PDL analysis processing, a color conversion processing, and a Raster Image Processing (RIP) processing. The PDL analysis processing analyzes the print job to extract objects to generate RGB image data. The color conversion processing converts the RGB image data into CMYK image data. The RIP processing reads the CMYK image data from the memory to generate pixel data as pixelmap data of the respective colors and writes it in the memory. The RIP processing typically executes a large amount of processing and generally executes it using dedicated hardware (ASIC).

SUMMARY

An image forming method according to one aspect of the disclosure uses a memory and forms an image on a print medium using color materials of L (L is an integer of two or more) colors. The image forming method includes: setting N (N is a natural number) groups associated for respective N objects. The N objects include a plurality of scanning lines and are reproduced with the color materials of the L colors; calculating a relative address for storing tone data representing a tone of one color material among the color materials of the L colors based on coordinates of a plurality of pixels forming the plurality of scanning lines to calculate L addresses. The L addresses are separated by shifting the relative address using a predetermined offset address; and transmitting and receiving L tone data to/from the memory via L channels among M (M is an integer larger than N) communication channels. The L tone data represent tones of respective L color materials for reproducing colors of the plurality of pixels forming the scanning lines by using the L addresses.

An image forming apparatus according to another aspect of the disclosure includes a processor, a memory and a program instruction stored in the memory. The program instruction executed by the processor causes the image forming apparatus to: set N (N is a natural number) groups. The N groups are associated for respective N objects that include a plurality of scanning lines and are reproduced with color materials of L (L is an integer of two or more) colors; calculate a relative address for storing tone data representing a tone of one color material among the color materials of the L colors based on coordinates of a plurality of pixels forming the plurality of scanning lines to calculate L addresses. The L addresses are separated by shifting the relative address using a predetermined offset address; transmit and receive L tone data to/from the memory via L channels among M (M is an integer larger than N) communication channels, and the L tone data represent tones of respective L color materials for reproducing colors of the plurality of pixels forming the scanning lines by using the L addresses; and form an image on a print medium using the color materials of the L colors.

A non-transitory computer-readable recording medium according to another aspect of the disclosure stores a control program for controlling an image forming apparatus. The image forming apparatus includes a processor and a memory and forms an image on a print medium using color materials of L (L is an integer of two or more) colors. The control program includes a program instruction. The program instruction causes the image forming apparatus to: set N (N is a natural number) groups. The N groups are associated for respective N objects. The N objects include a plurality of scanning lines and are reproduced with the color materials of the L colors; calculate a relative address for storing tone data representing a tone of one color material among the color materials of the L colors based on coordinates of a plurality of pixels forming the plurality of scanning lines to calculate L addresses. The L addresses are separated by shifting the relative address using a predetermined offset address; and transmit and receive L tone data to/from the memory via L channels among M (M is an integer larger than N) communication channels. The L tone data represent tones of respective L color materials for reproducing colors of the plurality of pixels forming the scanning lines by using the L addresses.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
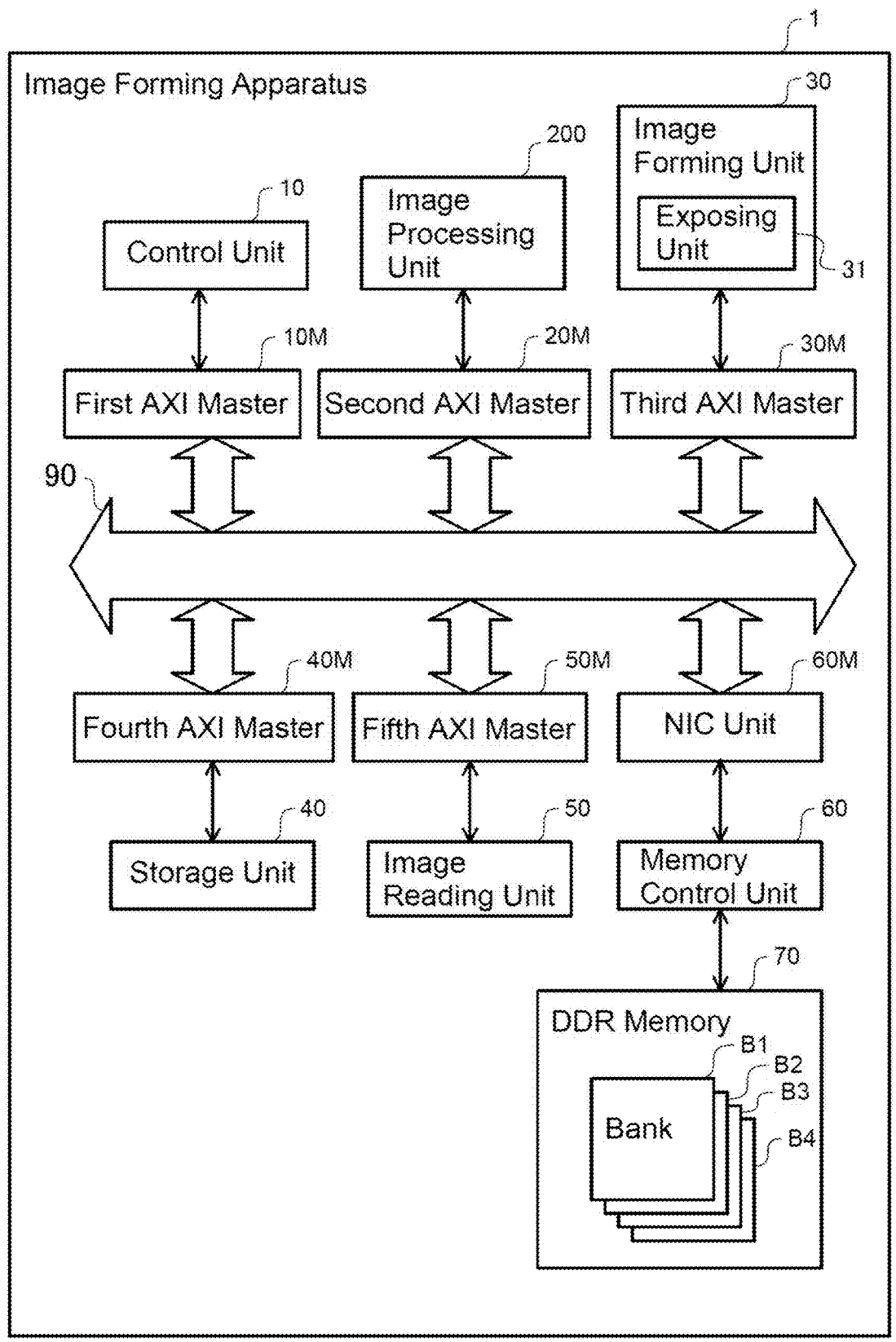
FIG. 1 is a block diagram illustrating a functional configuration of an image forming apparatus 1 according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes a configuration for implementing the disclosure (hereinafter referred to as an "embodiment") with reference to the drawings.

FIG. 1 is a block diagram illustrating a functional configuration of an image forming apparatus 1 according to one embodiment of the disclosure. The image forming apparatus 1 includes: a control unit 10; an image processing unit 200; an image forming unit 30; a storage unit 40; an image reading unit 50; a memory control unit 60; and an AXI bus 90 that mutually connects these units. The AXI bus 90 enables the respective units to communicate with one another in accordance with an AXI protocol. The image forming apparatus 1 further includes a DDR memory 70 that is controlled by the memory control unit 60. The image forming unit 30 includes an exposing unit 31. The DDR memory 70 includes, as one example, four banks, namely, a first bank B1, a second bank B2, a third bank B3, and a fourth bank B4.

The image forming apparatus 1 further includes: a first AXI master 10M that is connected to the control unit 10; a second AXI master 20M that is connected to the image processing unit 200; a third AXI master 30M that is connected to the image forming unit 30; a fourth AXI master 40M that is connected to the storage unit 40; a fifth AXI master 50M that is connected to the image reading unit 50; and a Network Interconnect unit (also referred to as an NIC unit (for example, AMBA Network Interconnect)) 60M that is connected to the memory control unit 60.

The first AXI master 10M, the second AXI master 20M, the third AXI master 30M, the fourth AXI master 40M, the fifth AXI master 50M, and the NIC unit 60M have a Direct Memory Access (DMA) control function.

The control unit 10 includes a processor such as a Micro Processing Unit (MPU) or a Central Processing Unit (CPU). The control unit 10 has a controller function related to interfaces such as various kinds of I/Os, a Universal Serial Bus (USB), a bus, and other hardware. The control unit 10 controls the whole image forming apparatus 1.

The storage unit 40 is a storage device configured of a hard disk drive, a flash memory, and similar memory, which are non-transitory storage media, and stores control programs and data of processes each executed by the control unit 10.

Figure 2:
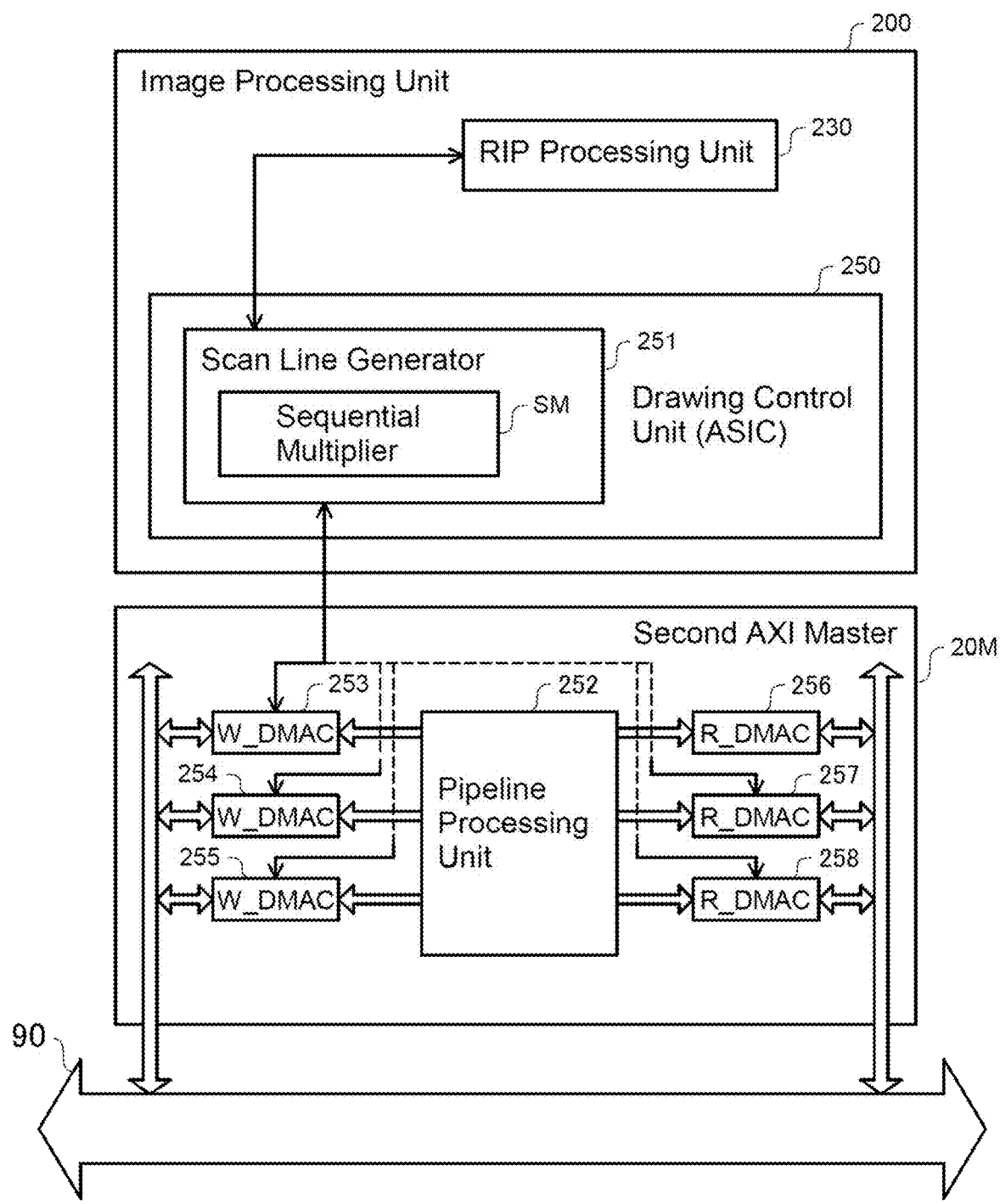
FIG. 2 is a block diagram illustrating a functional configuration of an image processing unit 200 according to the one embodiment.

FIG. 2 is a block diagram illustrating a functional configuration of the image processing unit 200 according to the one embodiment. The image processing unit 200 includes an RIP processing unit 230 and a drawing control unit 250. The drawing control unit 250 includes a scan line generator 251 and is connected to the second AXI master 20M via the scan line generator 251. The scan line generator 251 includes a sequential multiplier SM for executing a multiplication processing. The reason why a sequential multiplier is employed is to reduce, for example, the increased circuit size. The function of the scan line generator 251 will be described later.

The second AXI master 20M includes a pipeline processing unit 252 and DMACs 253 to 258 as six DMA controllers (see FIG. 2). In this example, among the six DMACs 253 to 258, the three DMACs 253, 254, and 255 are provided for writing, and the three DMACs 256, 257, and 258 are provided for reading. The six DMACs 253 to 258 have an identical configuration and each configure four channels (24 channels in total) of DMA controllers. The pipeline processing unit 252 includes a buffer (not illustrated) and executes a pipeline processing of inputting and outputting the six DMACs 253 to 258 assuming process contents in the image processing unit 200.

The control unit 10 executes a PDL analysis processing to analyze the print data described in Page Description Language in response to receiving of a print job including print data. This enables the control unit 10 to extract objects, such as texts (character), images, vector graphics, and Soft masks, which are included in the print data, to generate RGB image data in 256 tones and filter (control data). The RGB image data is pixelmap data of respective colors of RGB.

The control unit 10 can write the RGB image data into the DDR memory 70 via the first AXI master 10M, the AXI bus 90, the NIC unit 60M, and the memory control unit 60 in this order. The first AXI master 10M functions as a master module of the NIC unit 60M. The NIC unit 60M functions as a slave module of the first AXI master 10M. The NIC unit 60M functions as the master module of the memory control unit 60. The memory control unit 60 functions as an AXI slave module of the NIC unit 60M.

The first AXI master 10M transmits a write request packet, which includes the RGB image data and address data, to the AXI bus 90 by a DMA control function corresponding to an instruction from the control unit 10. The NIC unit 60M writes the RGB image data into the DDR memory 70 by using the memory control unit 60 corresponding to the write request packet. This enables the control unit 10 to write the RGB image data into the DDR memory 70.

The control unit 10 can receive the RGB image data from the DDR memory 70. Specifically, the first AXI master 10M transmits a read request data set to the AXI bus 90 by the DMA control function corresponding to an instruction from the image processing unit 200. The read request data set includes the address data that specifies an address of the read data.

The NIC unit 60M, corresponding to the read request data set, reads the RGB image data from the DDR memory 70 by using the memory control unit 60, and then transmits it to the AXI bus 90. The AXI bus 90 transmits a read data packet, which includes the RGB image data, to the first AXI master 10M.

The control unit 10 executes a color conversion processing on the RGB image data received from the first AXI master 10M. This enables the image processing unit 200 to generate CMYK image data as data representing tone values of respective color materials of CMYK. Subsequently, the control unit 10 can write the CMYK image data into the DDR memory 70 via the first AXI master 10M, the AXI bus 90, the NIC unit 60M, and the memory control unit 60 in this order. The CMYK image data is pixelmap data of respective colors of CMYK.

The RIP (Raster Image Processing) processing unit 230 of the image processing unit 200 executes an RIP processing on the CMYK image data received from the second AXI master 20M. This enables the RIP processing unit 230 to generate pixel data, which is pixelmap data of the respective colors. This pixel data is converted into dot data by halftoning processing in the image forming unit 30. The dot data is data for representing dot formation states formed on a print medium by use of color materials. The pixel data is generated for each color material of CMYK.

Subsequently, the image processing unit 200 can write the pixel data into the DDR memory 70 via the second AXI master 20M, the AXI bus 90, the NIC unit 60M, and the memory control unit 60 in this order.

The image forming unit 30, similarly to the image processing unit 200, can read the pixel data from the DDR memory 70 to receive the pixel data via the memory control unit 60, the NIC unit 60M, the AXI bus 90, and the third AXI master 30M in this order.

The exposing unit 31 of the image forming unit 30 can execute an exposure processing for development drums (not illustrated) of the respective colors based on the dot data, which is generated by executing the halftoning processing on the pixelmap data of the respective colors. Following the exposure processing, the image forming unit 30 can execute a development processing and a fixing processing to execute an image formation processing.

Figure 3:
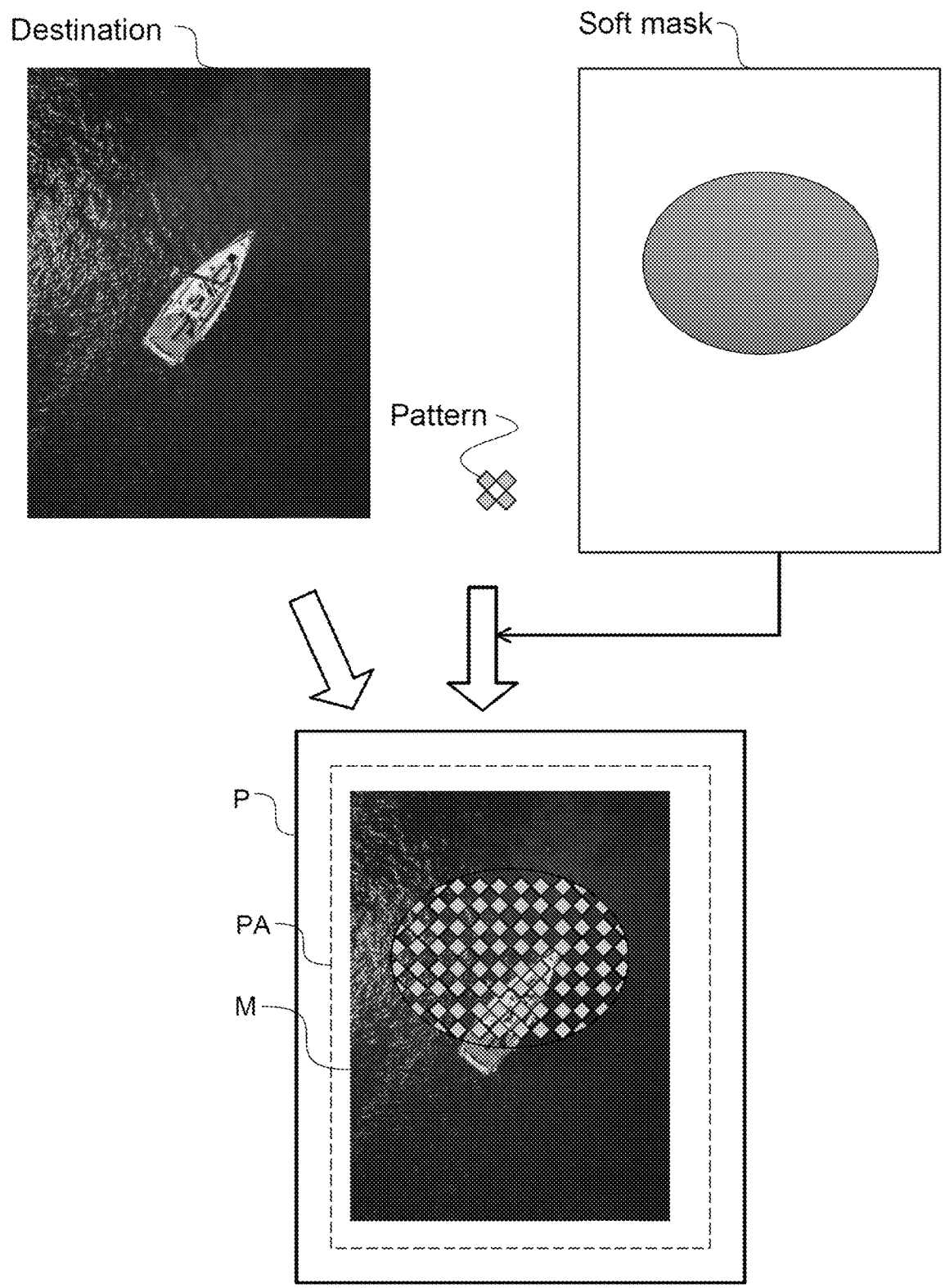
FIG. 3 is an explanatory diagram illustrating one example of image formation according to the one embodiment.

FIG. 3 is an explanatory diagram illustrating one example of image formation according to the one embodiment. In this example, it is assumed that, as the pixel data, three types of objects of destination, pattern, and soft mask are stored in the DDR memory 70. The destination and the pattern are image objects representing an image. The soft mask is a control object representing a transparency for the image object.

As an example in the above-described rectangular region and FIG. 3, the destination includes a pixel group located at a predetermined position within an image-formable position on the print medium. The pattern includes the pixel group tiled to be repeatedly located in a region within the image-formable position on the print medium. The soft mask is a filter and indicates a transparency for another object. In this example, the pattern is configured to be applied within a range of an ellipse indicated in gray. This reproduces an image M within an image-formable range PA on a print medium P.

Figures 4A, 4B:
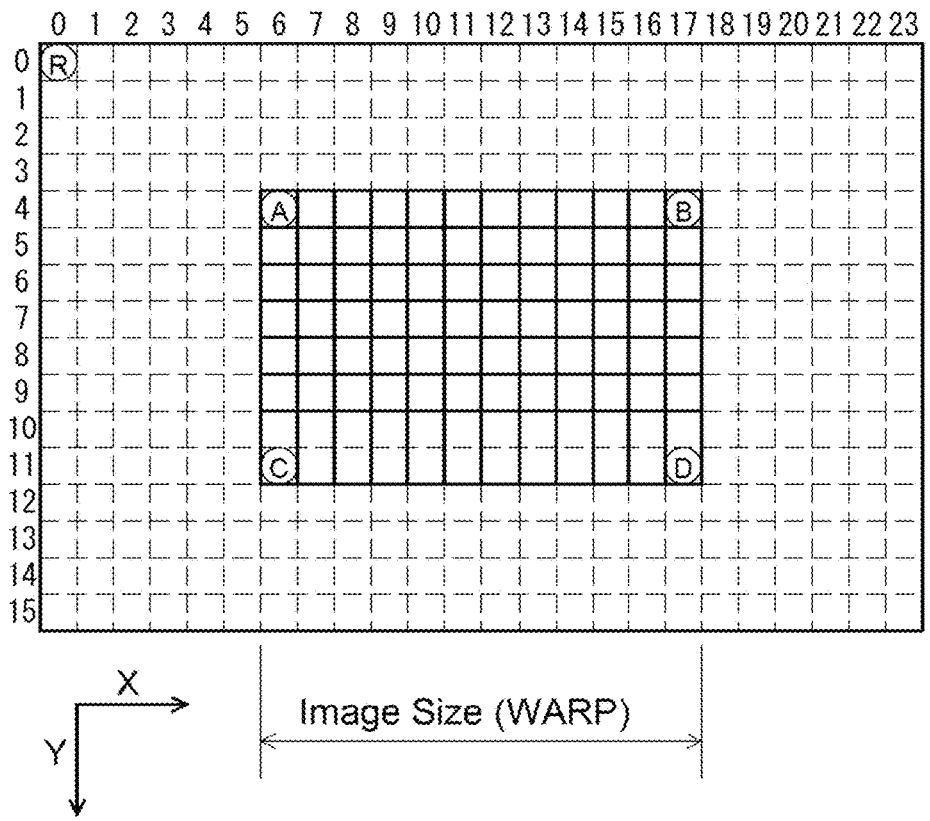
FIGS. 4A and 4B are explanatory diagrams illustrating contents of address conversion according to the one embodiment.

FIGS. 4A and 4B are explanatory diagrams illustrating contents of address conversion according to the one embodiment. FIG. 4A illustrates one example of the CMYK image data generated by the control unit 10. The CMYK image data constitutes a rectangular region surrounded by four pixels of a pixel A, a pixel B, a pixel C, and a pixel D. The rectangular region has a size of 12 pixels in an X-axis direction and a size of 8 pixels in a Y-axis direction and includes 96 pixels in total. The rectangular region is located such that the rectangular region includes the pixel A located on a left uppermost portion at the position, which is shifted by 6 pixels in the X-axis direction and 4 pixels in the Y-axis direction from a predetermined reference pixel R. The respective pixels have four tone values of CMYK in 256 tones, which are each of 0 to 255 tones.

FIG. 4B illustrates a calculation formula F for allocating a memory space in the DDR memory 70 by using coordinates of the respective pixels. The calculation formula F is a formula for converting the coordinates of the respective pixels (an X value, a Y value) into a memory address (Pixel Address). The RIP processing unit 230 identifies the position by using the coordinate of the pixel in an image processing, and thus can know the position of the data necessary for a processing by converting the coordinates of the respective pixels into the memory address (Pixel Address).

However, the calculation formula F assumes that a depth (DEPTH) is 8 bits (1 byte)/pixel, that is, 8 bits of the respective pixels represent 256 tones. The depth (DEPTH) is a value determined based on a tone number reproduced in the respective pixels. In this example, the depth is 8 bits (1 byte)/pixel, and thus the respective pixels require 8 bits of the memory spaces. The data representing the depth is referred to as depth data.

Figure 5:
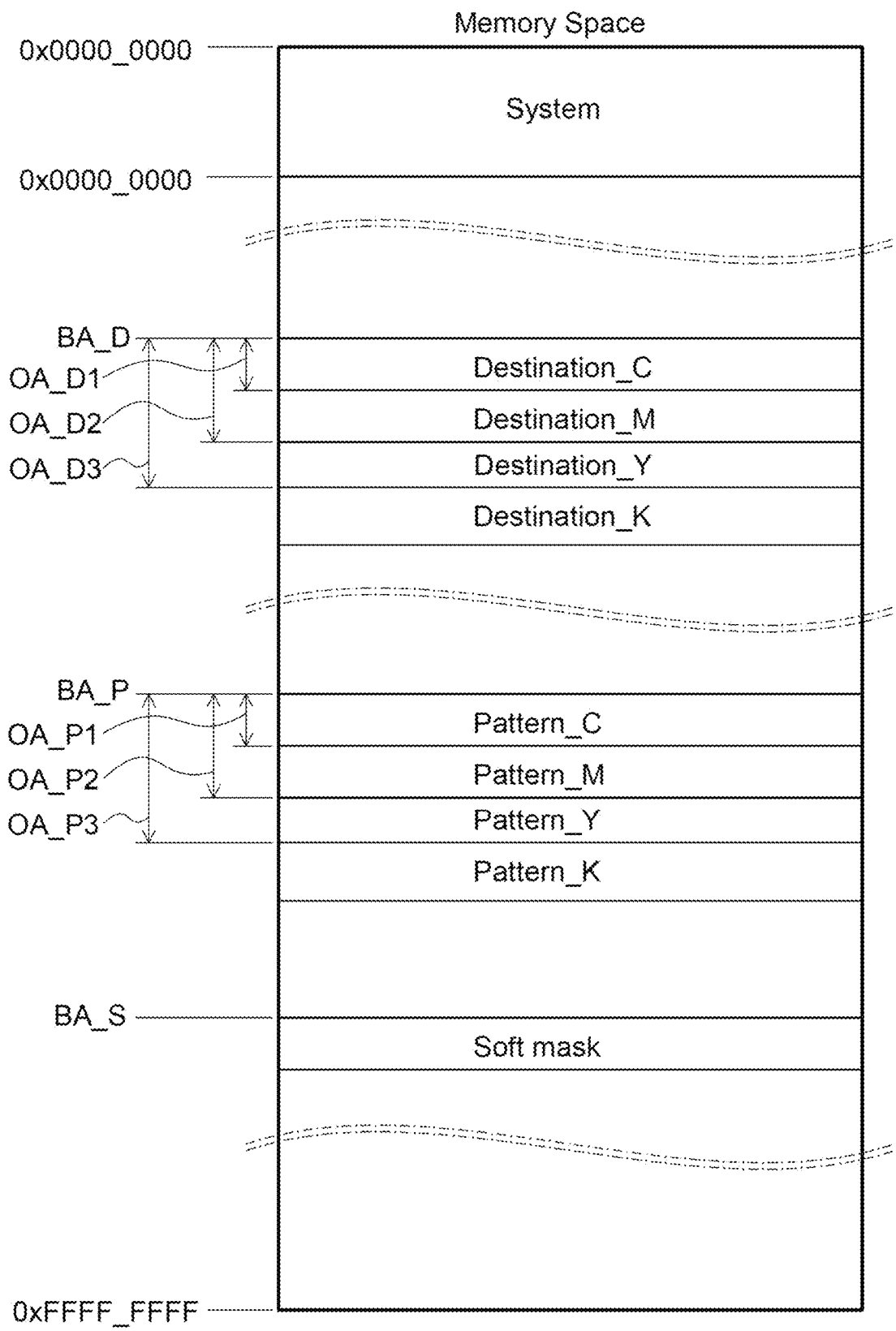
FIG. 5 is an explanatory diagram illustrating a memory space according to the one embodiment.

FIG. 5 is an explanatory diagram illustrating the memory space according to the one embodiment. A base address BA of the calculation formula F is an address as a reference object-by-object. The destination is an image object and has the CMYK image data. The CMYK image data is located at an address where a base address BA_D is used as a reference.

Each of the image data of CMYK of the destination is located at the address partitioned by an offset address. Specifically, the image data of cyan C of the destination (also referred to as tone data) is located from an address of the base address BA_D. That is, in this example, an offset address OA_D0=0. The image data of magenta M of the destination (also referred to as tone data) is located from the address offset by an offset address OA_D1 from the address of the base address BA_D. The image data of yellow Y of the destination (also referred to as tone data) is located from the address offset by an offset address OA_D2 from the address of the base address BA_D. The image data of black K of the destination (also referred to as tone data) is located from the address offset by an offset address OA_D3 from the address of the base address BA_D.

The offset address OA_D1 may be appropriately set to a range sufficient for storing the image data of cyan C in accordance with an image range of the object and may unambiguously set it assuming the maximum data amount. The offset address OA_D2 can be set as, for example, two times of the offset address OA_D1. The offset address OA_D3 can be set as, for example, three times of the offset address OA_D1. These are because each of the image data of CMYK has an identical size for each object. Thus, repeatedly offsetting to shift using a specific offset address, such as the offset address OA_D1, can also set the offset address OA_D2 and the offset address OA_D3.

The pattern as the image object has the CMYK image data. The CMYK image data is located at an address where a base address BA_P is used as a reference. Each of the image data of CMYK of the pattern is located at the address partitioned by the offset address from the base address BA_P (see FIG. 5). Specifically, each of the image data of CMYK of the pattern is located from the address offset by offset addresses OA_P1, OA_P2, and OA_P3 from an address of the base address BA_P. That is, in this example, an offset address OA_P0=0. The offset addresses OA_P1, OA_P2 and OA_P3 can be set similarly to the offset addresses OA_D1, OA_D2, and OA_D3.

Meanwhile, the control object does not have the CMYK image data and has the control data representing the transparency for the pattern. The control data is located without using the offset address from a base address BA_S. This is because the offset address is data to partition the memory space so as to store each of the image data of CMYK. However, offsets may be provided. That is, the offset addresses are addresses for ensuring a C region for storing the image data of C, an M region for storing the image data of M, a Y region for storing the image data of Y, and a K region for storing the image data of K.

Each of the image data of CMYK of the image object is located at a relatively identical address (the relative address) in the C region, the M region, the Y region and the K region. The respective addresses of CMYK in the C region, the M region, the Y region, and the K region are the positions calculated by adding a value (an X value) of an X-coordinate to the product of a value (a Y value) of a Y-coordinate and a warp (WARP). Here, the warp is a memory amount that can store a count of pixels of an image size (a count of pixels in the X-axis direction), that is, the memory amount equal to or more than the number of pixels and is used for calculating a pixel position on the second and following rows.

Figure 6:
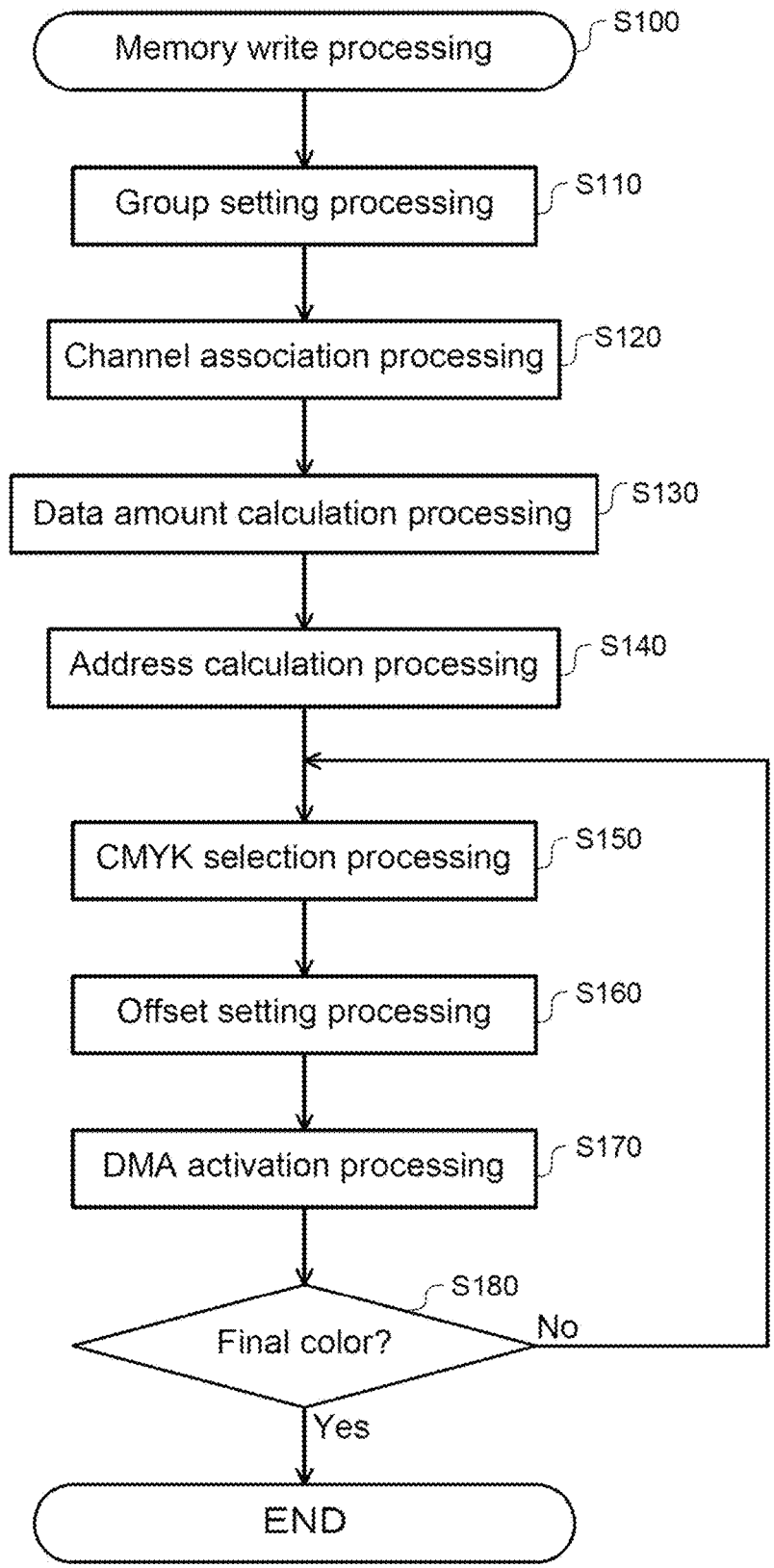
FIG. 6 is a flowchart illustrating contents of a memory write processing according to the one embodiment.
Figure 7:
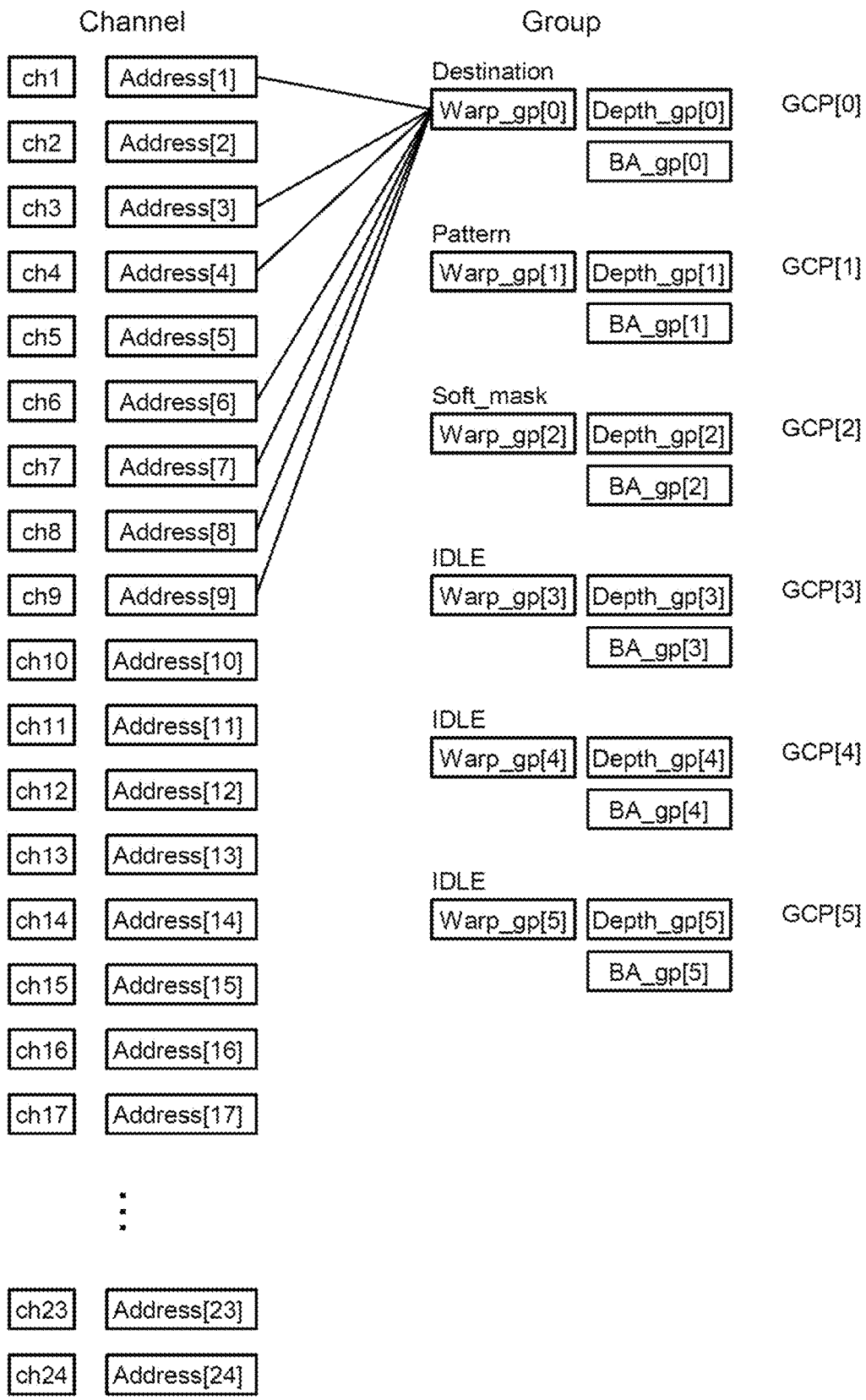
FIG. 7 is an explanatory diagram illustrating a relationship between channels and groups according to the one embodiment.

FIG. 6 is a flowchart illustrating contents of a memory write processing (Step S100) according to the one embodiment. FIG. 7 is an explanatory diagram illustrating a relationship between channels and groups according to the one embodiment. A first channel ch1 to a fourth channel ch4 are channels of the DMAC 253 for reading and writing. A fifth channel ch5 to an eighth channel ch8 are channels of the DMAC 254 for reading and writing. A ninth channel ch9 to a 12th channel ch12 are channels of the DMAC 255 for reading and writing. A 13th channel ch13 to a 24th channel ch24 are channels of the three the DMACs 256, 257, and 258 for reading. The RIP processing unit 230 executes the memory write processing to write each of the image data of CMYK into the DDR memory 70 by using the scan line generator 251.

At Step S110, the scan line generator 251 executes a group setting processing. In the group setting processing, the RIP processing unit 230 sets a group to each of the destination and the pattern. In this example, the destination is set to a group 0, and the pattern is set to a group 1 (see FIG. 7).

The group 0 includes warp_gp[0] as a warp of the destination, depth[0] as a depth of the destination, and ba_gp[0] as a base address of the destination. The group 1 includes warp_gp[1] as a warp of the pattern, depth[1] as a depth of the pattern, and ba_gp[1]] (in the example in FIG. 5, BA_P) as a base address of the pattern.

In the example in FIG. 4A, the warp_gp[0] as the warp of the destination is 12 pixels as the number of pixels of the image size (the number of pixels in the X-axis direction). Depth[0] as the depth of the destination is 8 bits (1 byte)/pixel. Ba_gp[0] as the base address of the destination is a predetermined position (in the example in FIG. 5, BA_D).

At Step S120, the scan line generator 251 executes a channel association processing. In the channel association processing, the scan line generator 251 associates the group 0 (the destination) with the seven channels, which are empty channels (in this example, the first channel ch1, the third channel ch3, the fourth channel ch4, and the sixth channel ch6 to the ninth channel ch9). This association is registered in a group channel bit GCP[0]. These seven channels are channels for attribution tag, shape, and alpha in a pdf specification, in addition to the respective colors of CMYK.

At Step S130, the scan line generator 251 executes a data amount calculation processing. In the data amount calculation processing, the scan line generator 251 calculates a data amount by using the warp and the depth. Specifically, the scan line generator 251 uses the sequential multiplier SM to multiply 12 pixels as the number of pixels of the image size by 8 bits as the number of bits for each pixel, so as to calculate 96 bit as the data amount. This data amount is a data amount required for reproducing one color in the 12 pixels forming the scanning line from the pixel A to the pixel B in FIG. 4A.

At Step S140, the scan line generator 251 executes an address calculation processing. In the example in FIG. 4A, the scan line generator 251 uses the coordinate of the pixel A (6, 4) to calculate a relative address representing a relative position of the address space corresponding to the pixel A. An address position is the position determined by adding 6×8 bits+4×12 pixels×8 bits and the offset address to the base address BA_D. This enables the scan line generator 251 to ensure an address space for 12 pixels, which constitutes the first scanning line (from the pixel A to the pixel B), based on a start position (the coordinate) and the number of pixels.

At Step S150, the scan line generator 251 executes a CMYK selection processing. In the CMYK selection processing, the scan line generator 251 sequentially selects the image data of CMYK.

At Step S160, the scan line generator 251 executes an offset setting processing. In this example, the scan line generator 251 sets zero as an offset address of the image data of C, sets the offset address OA_D1 as an offset address of the image data of M, sets the offset address OA_D2 as an offset address of the image data of Y, and sets the offset address OA_D3 as an offset address of the image data of K.

The offset address OA_D1 is determined as an amount to ensure an address space sufficient for storing the image data of C. The offset address OA_D2 and the offset address OA_D3 are determined as amounts to ensure: an address space sufficient for storing the image data of C and M; and an address space sufficient for storing the image data of CMY, respectively. This generates address data for identifying an address space for ensuring the data amount calculated from the first position in the memory space. The address data includes the address position as a write start position and the data amount (in this example, 96 bits).

At Step S170, the scan line generator 251 executes a DMA activation processing. In the DMA activation processing, the scan line generator 251 transmits the image data of C from the pixel A to the pixel B along with the address data to the channel (for example, the first channel ch1) associated with the group 0 and activates the first channel ch1 of the DMAC 253. The scan line generator 251 executes such processing (Steps S150 to S170) on all the colors (Step S180).

It is preferred to include a buffer (not illustrated) for an output of the sequential multiplier SM so as to enable the multiplication processing for the next group to be executed while the processing of the respective colors is executed. This enables the scan line generator 251 to further improve the operation efficiency to speed up the calculation processing speed of the address of the memory. Further, the above-described address calculation can be used to read the image data of CMYK, and read and write the RGB image data.

Thus, the image forming apparatus 1 according to the one embodiment ensures the address calculation for identifying a storage destination of the image data of the four colors of CMYK by simply calculating a relative address of one color among the image data of the four colors of CMYK through the processing including the multiplication processing and the addition processing of the offset address for the other three colors. As described above, the number of multiplication processing is small. This ensures the employment of a sequential multiplier that requires a plurality of time clocks for one multiplication and also ensures the decreased circuit size.

In addition to the above-described respective embodiments, the disclosure can also be embodied by the following modifications.

Modification 1:

While in the above-described respective embodiments the image forming apparatus uses the color materials of the four color of CMYK, the color material is not limited to the four color of CMYK. The disclosure is also applicable to an image forming apparatus that uses a color material of a spot color, such as gold, silver, and pastel color. Furthermore, the disclosure is also applicable to a two-color printing (for example, K and any one color of CMY). The disclosure is also applicable to an image forming apparatus that forms an image on a print medium using color materials of L colors (L is an integer of two or more).

Modification 2:

While in the above-described respective embodiments the second AXI master 20M of the disclosure uses a Direct Memory Access (DMA) having 24-channel communications, the number of communication channels is not limited to the 24 channels. In the disclosure, it is only necessary that the number of communication channels is smaller than the number of groups.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming method that uses a memory and forms an image on a print medium using color materials of L (L is an integer of two or more) colors, comprising:
   setting N (N is a natural number) groups associated for respective N objects, the N objects including a plurality of scanning lines and being reproduced with the color materials of the L colors;
   calculating a relative address for storing tone data representing a tone of one color material among the color materials of the L colors based on coordinates of a plurality of pixels forming the plurality of scanning lines to calculate L addresses, the L addresses being separated by shifting the relative address using a predetermined offset address; and
   transmitting and receiving L tone data to/from the memory via L channels among M (M is an integer larger than N) communication channels, the L tone data representing tones of respective L color materials for reproducing colors of the plurality of pixels forming the scanning lines by using the L addresses.

2. The image forming method according to claim 1, wherein the calculating sets a base address in a memory space of the memory to calculate one address among the L addresses by using the base address and the relative address, so as to calculate the L addresses by repeatedly performing an offset to shift (L−1) addresses as the predetermined offset address among the L addresses using a specific offset address.

3. The image forming method according to claim 1, wherein the calculating uses depth data representing a count of bits and multiplies the count of bits to calculate the relative address, and the depth data is used for storing the tone data.

4. The image forming method according to claim 1, wherein the calculating uses a coordinate system where the coordinate is configured such that a direction of the scanning line is an X-axis, and a direction orthogonal to the scanning line is a Y-axis, so as to calculate the relative address by using a value obtained by multiplying the count of pixels forming the scanning line by a Y value and then adding an X value.

5. The image forming method according to claim 4, wherein the calculating uses a sequential multiplier to calculate the relative address.

6. The image forming method according to claim 1, further comprising
   reproducing the object as an image formed by arranging the scanning lines side by side in the direction orthogonal to the scanning line.

7. An image forming apparatus comprising:
   a processor;
   a memory; and
   a program instruction stored in the memory,
   wherein the program instruction executed by the processor causes the image forming apparatus to:
   set N (N is a natural number) groups, the N groups being associated for respective N objects, the N objects including a plurality of scanning lines and being reproduced with color materials of L (L is an integer of two or more) colors;
   calculate a relative address for storing tone data representing a tone of one color material among the color materials of the L colors based on coordinates of a plurality of pixels forming the plurality of scanning lines to calculate L addresses, the L addresses being separated by shifting the relative address using a predetermined offset address;
   transmit and receive L tone data to/from the memory via L channels among M (M is an integer larger than N) communication channels, the L tone data representing tones of respective L color materials for reproducing colors of the plurality of pixels forming the scanning lines by using the L addresses; and
   form an image on a print medium using the color materials of the L colors.

8. The image forming apparatus according to claim 7, wherein the calculating sets a base address in a memory space of the memory to calculate one address among the L addresses by using the base address and the relative address, so as to calculate the L addresses by repeatedly performing an offset to shift (L−1) addresses as the predetermined offset address among the L addresses using a specific offset address.

9. The image forming apparatus according to claim 7, wherein the calculating uses depth data representing a count of bits and multiplies the count of bits to calculate the relative address, and the depth data is used for storing the tone data.

10. The image forming apparatus according to claim 7, wherein the calculating uses a coordinate system where the coordinate is configured such that a direction of the scanning line is an X-axis, and a direction orthogonal to the scanning line is a Y-axis, so as to calculate the relative address by using a value obtained by multiplying the count of pixels forming the scanning line by a Y value and then adding an X value.

11. The image forming apparatus according to claim 10, wherein the calculating uses a sequential multiplier to calculate the relative address.

12. The image forming apparatus according to claim 7, wherein the image forming apparatus reproduces the object as an image formed by arranging the scanning lines side by side in the direction orthogonal to the scanning line.

13. A non-transitory computer-readable recording medium storing a control program for controlling an image forming apparatus, the image forming apparatus including a processor and a memory and forming an image on a print medium using color materials of L (L is an integer of two or more) colors, the recording medium storing a program instruction, the program instruction causing the image forming apparatus to:
   set N (N is a natural number) groups, the N groups being associated for respective N objects, the N objects including a plurality of scanning lines and being reproduced with the color materials of the L colors;
   calculate a relative address for storing tone data representing a tone of one color material among the color materials of the L colors based on coordinates of a plurality of pixels forming the plurality of scanning lines to calculate L addresses, the L addresses being separated by shifting the relative address using a predetermined offset address; and transmit and receive L tone data to/from the memory via L channels among M (M is an integer larger than N) communication channels, the L tone data representing tones of respective L color materials for reproducing colors of the plurality of pixels forming the scanning lines by using the L addresses.

14. The recording medium according to claim 13, wherein the calculating sets a base address in a memory space of the memory to calculate one address among the L addresses by using the base address and the relative address, so as to calculate the L addresses by repeatedly performing an offset to shift (L−1) addresses as the predetermined offset address among the L addresses using a specific offset address.

15. The recording medium according to claim 13, wherein the calculating uses depth data representing a count of bits and multiplies the count of bits to calculate the relative address, and the depth data is used for storing the tone data.

16. The recording medium according to claim 13, wherein the calculating uses a coordinate system where the coordinate is configured such that a direction of the scanning line is an X-axis, and a direction orthogonal to the scanning line is a Y-axis, so as to calculate the relative address by using a value obtained by multiplying the count of pixels forming the scanning line by a Y value and then adding an X value.

17. The recording medium according to claim 16, wherein the calculating uses a sequential multiplier to calculate the relative address.

18. The recording medium according to claim 13, wherein the program instruction causes the image forming apparatus to reproduce the object as an image formed by arranging the scanning lines side by side in the direction orthogonal to the scanning line.

* * * * *